United States Patent [19]

Hanawaka

[11] Patent Number: 5,497,311
[45] Date of Patent: Mar. 5, 1996

[54] SWITCHING POWER SOURCE OF THE VOLTAGE RESONANCE TYPE

[75] Inventor: Masuo Hanawaka, Tokyo, Japan

[73] Assignee: Yokogawa Electric Corporation, Tokyo, Japan

[21] Appl. No.: 394,874

[22] Filed: Feb. 27, 1995

[30] Foreign Application Priority Data

Mar. 22, 1994 [JP] Japan .................... 6-050380

[51] Int. Cl.⁶ ................................. H02M 3/335
[52] U.S. Cl. ............................. 363/21; 363/97
[58] Field of Search ................. 363/20, 21, 56, 363/97

[56] References Cited

U.S. PATENT DOCUMENTS 5,029,269  7/1991  Elliott et al. ..................... 363/21
5,247,240  9/1993  Kayser et al. .................... 323/288
5,315,496  5/1994  Okochi et al. .................... 363/21

Primary Examiner—Peter S. Wong
Assistant Examiner—Adolf Berhane
Attorney, Agent, or Firm—Moonray Kojima

[57] ABSTRACT

A switching power source of a voltage resonant type having a circuit for detecting the lowest point of voltage applied to both ends of a switching element, a time signal generating circuit which is activated concurrently with the turning ON of the switching element to output a predetermined time signal, and a circuit for inhibiting the turning ON of the switching element based on the lowest point detection signal, while a time signal is outputted from the time signal generating circuit.

8 Claims, 4 Drawing Sheets

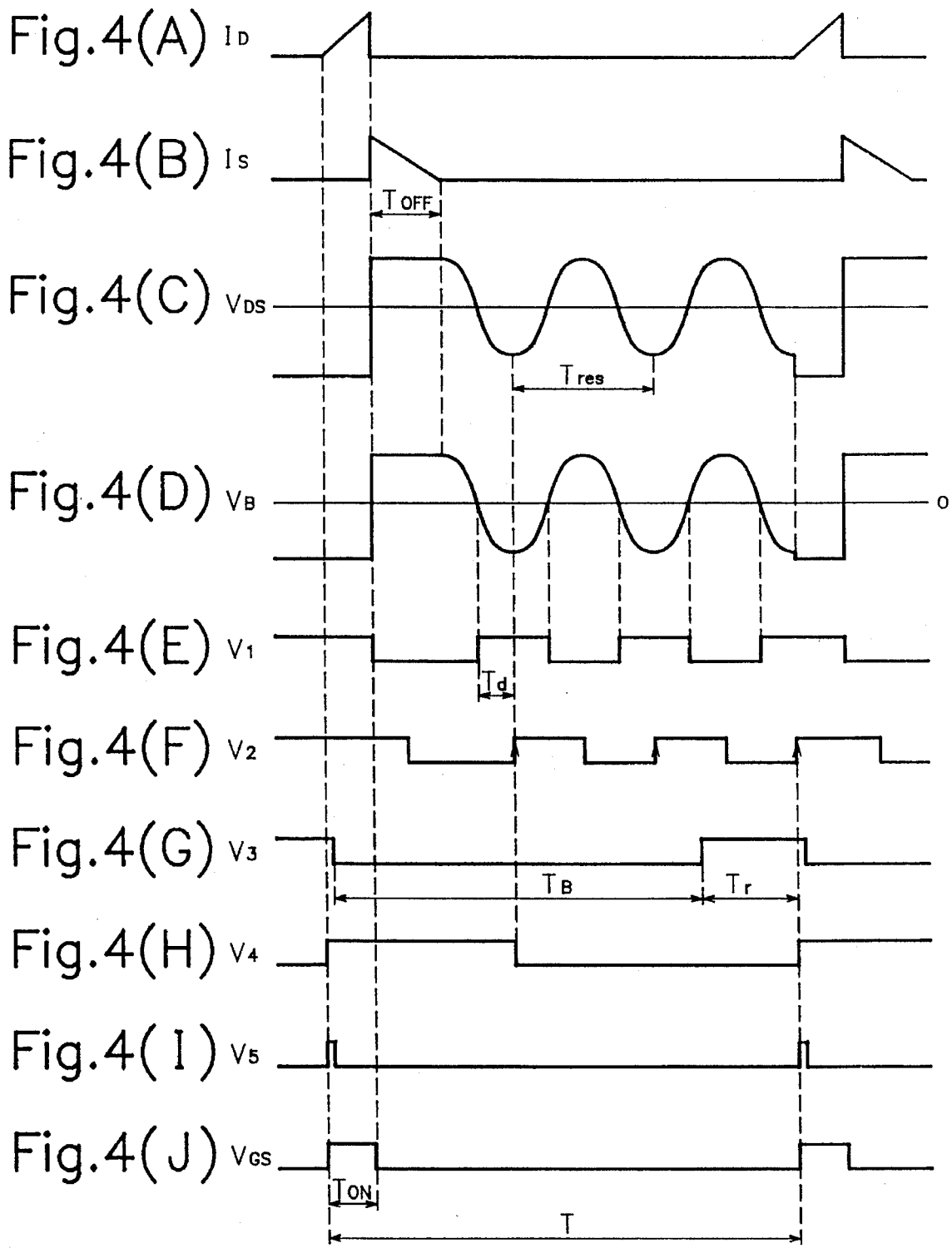

SWITCHING POWER SOURCE OF THE VOLTAGE RESONANCE TYPE

BACKGROUND OF THE INVENTION

1. Field of the Invention

This invention relates to a switching power source; and, more particularly, to an improved resonance type switching power source which can be readily miniaturized and which has improved efficiency and reduced switching loss.

2. Description of the Prior Art

In the prior art, a current discontinuous mode flyback resonance type circuit, such as shown in FIG. 1, has been used to reduce switching loss in a switching power source. This circuit utilizes the phenomenon of voltage resonance with the inductance of a primary winding and the capacitance of a resonance capacitor, after the secondary current becomes zero.

In FIG. 1, a rectified AC input voltage $V_{IN}$, for example, is applied to a circuit comprising a capacitor $C_1$ connected between one input terminal, whereat voltage $V_{IN}$ is supplied, and earth; a resistance $R_1$ for activating control circuit CTL, one end of which is connected to one end of a primary winding of an inductance $L_P$ (called "primary winding") and the other end of which is connected to control circuit CTL; a MOSFET $Q_1$ (which may be a bipolar transistor) used as a switching element, the drain electrode of which is connected to the other end of primary winding $L_P$ and the source electrode of which is connected to earth, and the gate electrode of which is connected to control circuit CTL; a secondary winding inductance $L_S$ (called "secondary winding"); and a bias winding inductance $L_B$ (called "bias winding"). The capacitor $C_1$ serves to rectify the voltage from the input. Primary winding $L_P$, secondary winding $L_S$ and bias winding $L_B$ are wound about the same core of transformer T.

The circuit further comprises a resonance capacitor $C_r$ connected in parallel between the source electrode and the drain electrode of switching element $Q_1$; a rectifying diode $D_1$ for creating a power source for control circuit CTL; resistors $R_2$ and $R_3$ for dividing a rectified smoothed output from bias winding voltage $V_B$, the anode of diode $D_1$ being connected to one end of bias winding $L_B$ and the cathode of diode $D_1$ being connected to earth via the dividing circuit comprising $R_2$ and $R_3$ and being connected also to earth via capacitor $C_3$. Capacitor $C_r$ may also be connected in parallel to primary winding $L_P$ with the same effect. Also, $C_3$ is a smoothing capacitor. The connection point between resistors $R_2$ and $R_3$ is connected to control circuit CTL to provide a feedback signal. The connection point between the cathode of diode $D_1$, resistor $R_2$ and capacitor $C_3$ is connected to the connection point between resistor $R_1$ and control circuit CTL.

Diode $D_2$ rectifies voltage generated in secondary winding $L_S$ and is connected to smoothing capacitor $C_2$. The another of diode $D_2$ is connected to one end of secondary winding $L_S$ and the cathode thereof is connected to an output terminal and to one end of capacitor $C_2$. The other end of capacitor $C_2$ is connected to the other end of secondary winding $L_S$ and to another input terminal.

Zero cross detecting circuit ZCD detects the zero axis crossing by bias winding voltage $V_B$. After the zero cross output $V_1$ is delayed by a certain period of time, e.g. a quarter of a resonance period, by a delay circuit DLY, it is added to a waveform shaping circuit WS to perform edge differentiation and to provide a synchronization signal SYNC (also labeled $V_2$) for the control circuit CTL. The edge differentiation in waveform shaping circuit WS is not necessary when the control circuit CTL is synchronized at the leading or trailing edge.

The circuit thus described is basically a flyback converter. That is, when switching element $Q_1$ is ON, no current flows in secondary winding $L_S$ because diode $D_2$ is inverse biased by the voltage induced by secondary winding $L_S$. When switching element $Q_1$ is ON, primary winding $L_P$ is excited by voltage $V_{IN}$ and energy is stored in transformer T. When switching element $Q_1$ is OFF, secondary winding $L_S$ is reset by the output voltage and energy stored in transformer T is supplied to the load.

Operation of the FIG. 1 circuit will now be discussed with reference to waveform charts of FIGS. 2(A)–2(G).

When a pulse signal of a voltage $V_{GS}$ (see FIG. 2(G)) which exceeds a threshold value for turning ON switching element $Q_1$, is applied between the gate electrode and the source electrode of switching element $Q_1$ from control circuit CTL, switching element $Q_1$ is turned ON. As a result, a drain current $I_D$ (see FIG. 2(A)) increases with a slope or inclination of $V_{IN}/L_P$, as indicated by the waveform. When switching element $Q_1$ is turned ON, after a time $T_{ON}$, corresponding to the output voltage, elapses, energy stored in transformer T is released from secondary winding $L_S$ and charges capacitor $C_2$. Current $I_S$, flowing in diode $D_2$, decreases with a slope of about $-V_{out}/L_S$ and soon becomes zero, as shown in FIG. 2(B), ignoring the forward voltage in diode $D_2$. Although there is a current continuous mode flyback converter which turns ON switching element $Q_1$ again before current $I_S$ becomes zero, a current discontinuous mode by which current $I_S$ once becomes zero is discussed hereat.

When current $I_S$ becomes zero, diode $D_2$ is turned OFF, and secondary winding $L_S$ is shifted to a high impedance state. As a result, voltage in the primary winding starts to resonate at time periods determined by the inductance $L_P$ and capacitance $C_r$, and decreases with a cosine curve. In terms of voltage $V_{DS}$ between the drain electrode and the source electrode of switching element $Q_1$, it decreases with a cosine curve from $V_{IN}+N+(V_o * V_f)$ to $V_{IN}-N*(V_o+V_f)$, as shown in FIG. 2(C). Note that, $V_f$ is the forward voltage of diode $D_2$.

Because switching loss of a MOSFET is typically expressed by $0.5 * (C_{oss}+C_r) * V_{DS} * V_{DS} * f$, wherein f is the switching frequency, when a parasitic capacitance between the drain electrode and the source electrode is $C_{oss}$, switching loss becomes great if voltage $V_{DS}$ between the drain electrode and the source electrode is increased, requiring a larger heat sink, etc., and increasing the difficulty of thermal design. Also, because it is proportional to an increase in switching frequency.

In FIG. 1, switching loss is minimized by reducing the drain source voltage $V_{DS}$. It is accomplished by detecting the lowest point of the resonance waveform and turning ON MOSFET $Q_1$ at that point, as shown in FIG. 2(C). While the waveform shown in FIG. 2(D) may be obtained in biased winding $L_B$, the zero crossing point of this waveform advances by a quarter of the resonance period from the lowest point of the voltage $V_{DS}$. In actual practice, it is necessary to use a zero cross point which is delayed only by that period of time. The output $V_2$ of the waveform shaping circuit WS, shown in FIG. 2(F), is the delayed pulse thereof. This pulse $V_2$ is used to synchronize control circuit CTL, and trigger switching element $Q_1$ to turn it ON.

As a result of the foregoing operation, switching period T becomes $T=T_{ON}+T_r+T_{OFF}$. $T_r$ is one half of the resonance period determined by inductance $L_P$ and capacitance $C_r$, and may be expressed approximately by $T_r=pi[L_P(C_4+C_{oss})]^{1/2}$, as a constant value.

However, $T_{ON}$ and $T_{OFF}$ largely change, depending on input voltage $V_{IN}$ and output load. In particular, the influence of the load is great. Considering changes of the load from several % to 100% of the rating, switching period T may change by more than 10 times. Because switching loss is proportional to the switching frequency also, as described before, the loss at the maximum frequency becomes great if the frequency changes by more than 10 times (normally from several tens of kHz to several hundreds of kHz) and it becomes difficult to raise the lowest frequency. It then becomes a factor which obstructs miniaturization of the apparatus.

Also, the transformer and input filter, etc., are required to cover a very extensive frequency band of more than 10 times, causing great difficulty in design.

SUMMARY OF THE INVENTION

Accordingly, an object of the invention is to overcome the aforementioned problems, deficiencies and disadvantages of the prior art.

Another object is to provide a small and highly efficient switching power source by reducing changes of the switching frequency caused by fluctuations of the load.

The foregoing and other objects are attained by the invention, which encompasses a switching power source of the voltage resonant type constructed so as to turn ON a switching element by detecting the lowest point of a voltage applied to both ends of the switching element, and comprises means for detecting the lowest point of the voltage applied to both ends of the switching element; time signal generating means which is activated concurrently with the turning ON of the switching element to output a predetermined time signal; and means for inhibiting the turning ON of the switching element based on the lowest point detection signal while the time signal is outputted from the time signal generating means.

The turning ON operation of the switching element, based on the signal detecting the lowest point of the voltage applied to both ends of the switching element, is inhibited while the pulse signal is outputted from a non-multi-vibrator circuit.

Because the changes in switching frequency of the switching element, caused by the fluctuation of the load, and the like, are reduced and an optimal design around the switching frequency is attained, a miniaturized highly efficient power source is realized.

BRIEF DESCRIPTION OF THE DRAWINGS

FIGS. 4(A)–4(J) are waveform charts useful in explaining the operation of the embodiment of FIG. 3.

DETAILED DESCRIPTION OF THE PREFERRED EMBODIMENTS

Figure 1:
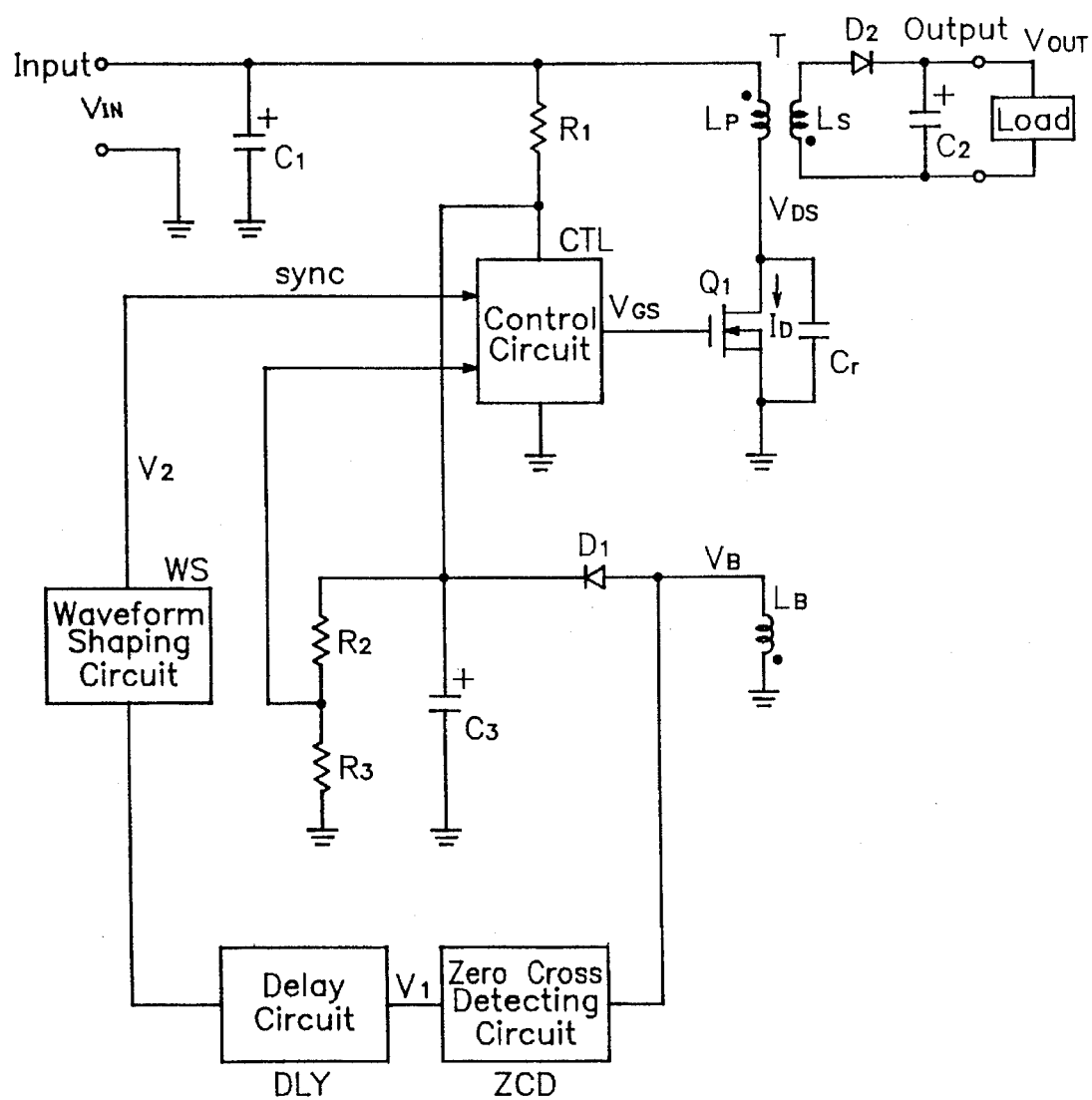
FIG. 1 is a diagram depicting a conventional switching power source.
Figure 2:
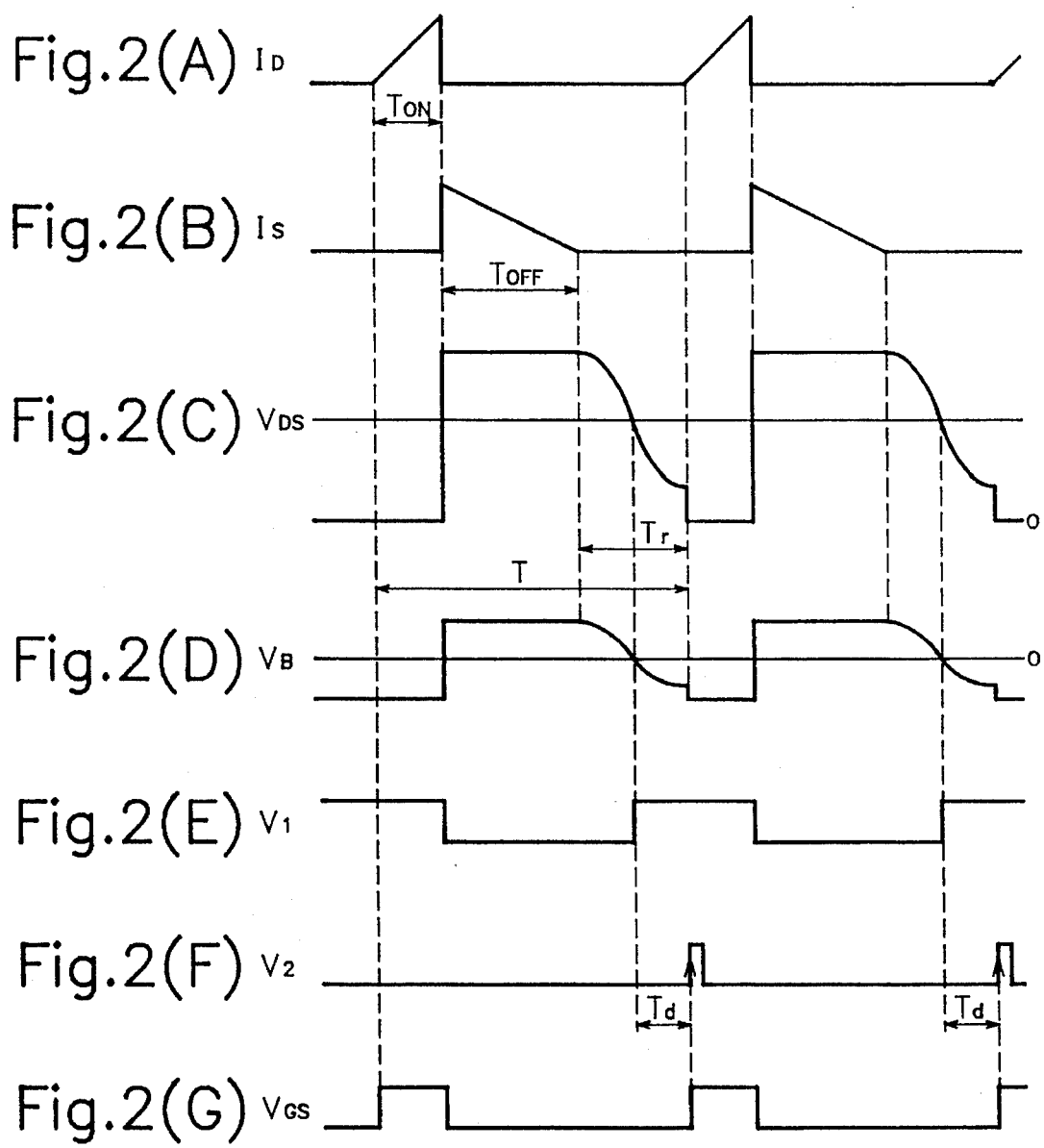
FIGS. 2(A)–2(G) are waveform charts useful in explaining the operation of the circuit of FIG. 1.
Figure 3:
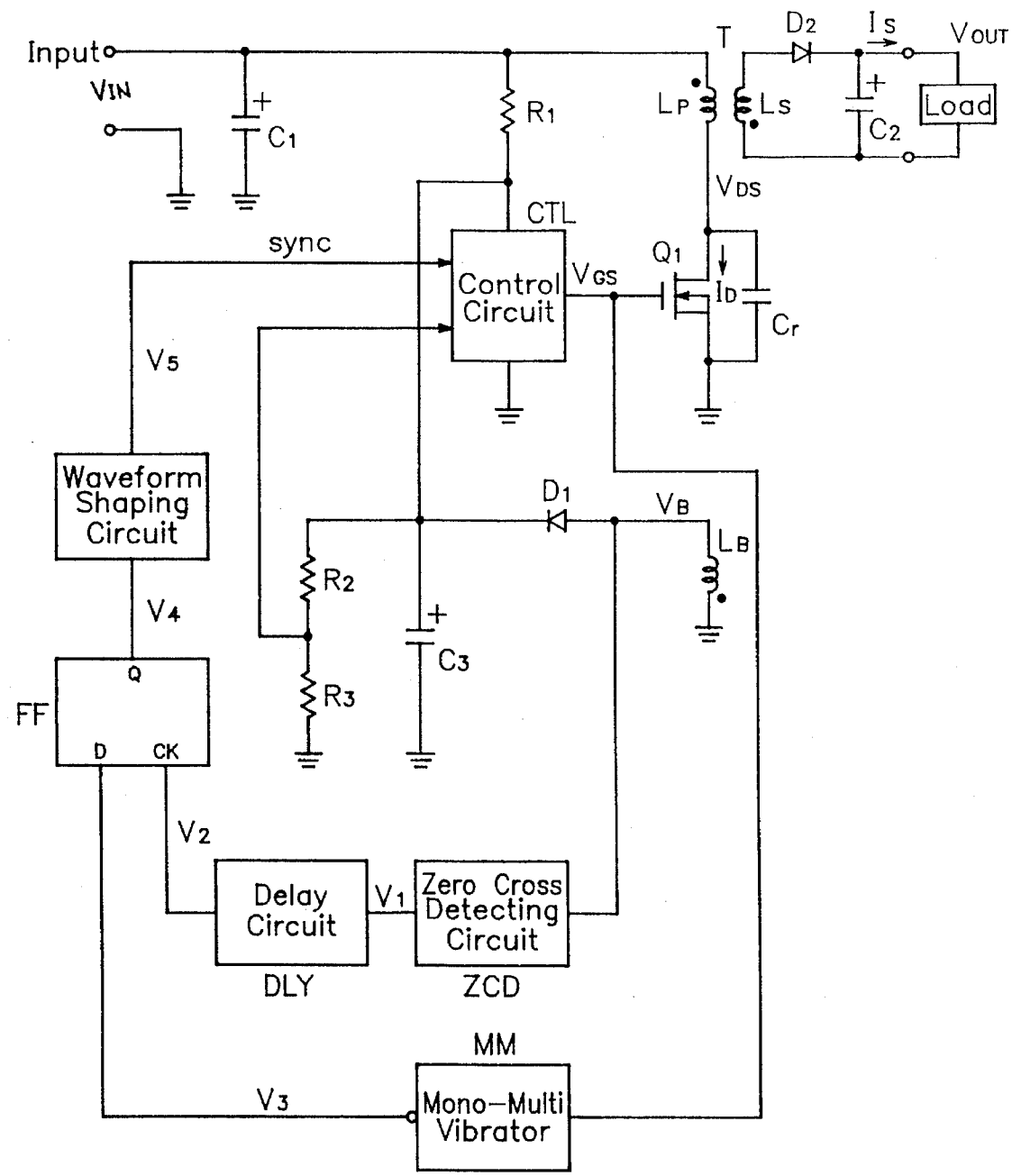
FIG. 3 is a diagram depicting an illustrative embodiments of the invention.

FIG. 3, wherein the same parts are labeled with the same reference symbols as in FIG. 1, depicts a circuit which differs from FIG. 1 in that there are added a mono-multi-vibrator circuit MM and a D1-type flip-flop circuit FF, which are triggered by output signals from control circuit CTL. An output pulse $V_3$ from mono-multi vibrator circuit MM is suppled to a data terminal D of D type flip-flop FF. An output signal $V_1$ from zero cross detecting circuit ZCD is supplied to delay circuit DLY and the resulting signal $V_2$ as a clock signal is applied to terminal CK. The D type flip flop FF functions as a means for inhibiting the turning ON of switching element $Q_1$, based on the output signal from zero cross detecting circuit ZCD, for a certain period of time.

In the FIG. 3 embodiment, the mono-multi-circuit MM, for generating a pulse signal having a predetermined pulse width and used as an inhibiting pulse $V_3$, is activated at the same time as switching element $Q_1$ is turned ON. Control circuit CTL ignores the detection signal $V_1$ from zero cross detecting circuit ZCD while mono-multi circuit MM outputs a signal $V_3$. That is, the zero cross detection signal $V_1$ is inhibited during that period. The D type flip flop FF synchronizes the leading edge of the pulse added from control circuit CTL to switching element $Q_1$ with the edge (leading edge in FIG. 3) of the first zero cross signal after inhibition.

The operation of the embodiment will now be given with reference to the waveform charts of FIGS. 4(A)–4(J).

When the pulse signal, of voltage $V_{GS}$, from control circuit CTL, which exceeds the threshold value for turning ON switching element $Q_1$, is applied between the gate electrode and the source electrode of switching elements $Q_1$, as shown in FIG. 4(J), switching element $Q_1$ is turned ON. ON the other hand, mono-multi-vibrator circuit MM is activated at the same time as switching element $Q_1$ is turned ON and supplies a pulse signal $V_3$, having a pulse width $T_B$, as shown in FIG. 4(G), to data terminal D of D type flip flop FF.

When switching element $Q_1$ is turned ON, the drain current $I_D$ increases with a slope of $V_{IN}/L_P$, such as represented by the waveform shown in FIG. 4(A). When switching element $Q_1$ is turned OFF, upon elapse of time $T_{ON}$, corresponding to the set output voltage, energy stored in transformer T is released from secondary winding $L_S$ and charges capacitor $C_2$. Current $I_s$, circulating in diode $D_2$ decreases with a slope of about $-V_{out}/L_s$ and soon becomes zero, as shown in FIG. 4(B), neglecting the forward voltage in diode $D_2$. When current $I_s$ becomes zero, diode $D_2$ is turned OFF and secondary winding $L_S$ is placed in a high impedance state. As a result, the primary winding voltage starts to resonate at time periods determined by the inductance $L_P$ and capacitance $C_r$, and drops while tracing a cosine wave, and repeats resonance during the inhibition period. When it is seen in terms of voltage $D_S$ between the drain electrode and the source electrode of element $Q_1$, it is shown as in FIG. 4(C), and waveform $V_B$ shown in FIG. 4(D) is obtained in bias winding $L_B$.

The zero cross detecting circuit ZCD detects a zero axis crossing by output waveform $V_B$ of bias winding $L_B$ and outputs a pulse signal $V_1$, as shown in FIG. 4(E). Pulse signal $V_1$ is applied to delay circuit DLY wherein the signal is delayed by a period of time $T_d$, which is equivalent to a quarter of the resonance period and is then inputted to the clock terminal CK of flip flop FF, as a clock signal $V_2$. FIG. 4(H) shows an output pulse $V_4$ from flip flop FF. Output pulse $V_4$ becomes L level at the leading edge of clock signal $V_2$ applied during the inhibition period and H level at the leading edge of clock signal $V_2$ applied after the inhibition period. The waveform shaping circuit WS differentiates the leading edge of output pulse $V_4$ from flip flop FF to generate a pulse signal $V_5$ as shown in FIG. 4(I) which is inputted to control circuit CTL as a synchronization signal. Control circuit CTL synchronizes control circuit CTL with pulse $V_5$ to trigger and turn ON switching element $Q_1$.

As a result of the foregoing operation, switching period T becomes $T=T_B+T_r$. From the view point of $T_r$, because the resonance period $T_{res}$ determined by inductance $L_P$ and capacitance $C_r$, and $T_B$, is asynchronous, $T_r$ changes from 0 to $T_{res}$. Note that $T_{res}$ may be expressed approximately by $T_{res}=2 \, pi[L_P \, (C_r+C_{oss})]^{1/2}$ and is constant.

Accordingly, although switching period T of switching element $Q_1$ changes from $T_B$ to $T_B+T_{res}$, generally $T_{res}$ is a fraction of switching period T. As a result, the rate of change of period T may be suppressed to about several tenths. That is, the invention enables one to set the switching period T at a relatively high value and achieve miniaturization of the apparatus because change of frequency is very small.

While in the above embodiment, the circuit for controlling the output voltage is by feeding back the bias winding voltage, it is also possible to feed back from the secondary side by using, for example, a photocoupler or the like, when the output voltage is required to be more precise.

Moreover, the invention is not confined to the control method above disclosed, and is applicable also to a current mode control method, for example. Moreover, although the zero crossing point of the bias winding voltage is detected when detecting the lowest point of the voltage applied to both ends of the switching element, it may also be detected from a change in the current, or the voltage, applied to both ends of the switching element itself. Also, the time signal generating means is not limited to only a mono-multivibrator circuit. It may also be a digital counter or an analog time constant circuit, for example. Furthermore, the means for inhibiting the turning ON of the switching element $Q_1$ for a predetermined time, is not to be limited only to the D type flip flop disclosed, and may instead comprise a logical gate having substantially the same functions.

As described above, a certain fixed part is generated in the switching period by inhibiting the detection of the lowest point of the voltage applied to both ends of the switching element for a predetermined period of time and the minimum switching period of the switching element may be restricted to this predetermined time. As a result, advantageously, changes in the switching frequency of the switching element become very small; the transformer and the input filter, etc, comprising the power source is optimized around this frequency; and a highly efficient and miniaturized power source is realized. Specifically, changes of frequency of more than 10 times required in the prior art is reduced by the invention to less than several tenths, instead. Although the actual lowest frequency has been several tens of kHz at most in the prior art, because the maximum frequency is increased when the lowest frequency is raised in order to miniaturized the power source, the invention allows the frequency to be raised to several hundred kHz and the transformer may be miniaturized by several order.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. In a switching power source of a voltage resonance type comprising a switching element to which a voltage is applied:

detecting means for detecting zero axis crossings of said voltage applied to said switching element and for providing a first signal having a leading edge at one zero crossing and a trailing edge at a subsequent zero crossing;

wave shaping means responsive to a signal for providing a synchronizing signal; and control means responsive to said synchronizing signal for turning ON said switching means; the improvement comprising switching means responsive to the turning ON of said switching means by said control means for generating a predetermined timing signal; and inhibiting means responsive to concurrent receipt of said predetermined timing signal from said switching means and said first signal from said detecting means for providing an inhibit signal to said wave shaping means, said inhibit signal become of one level when said first signal is at a leading edge during a period of inhibition and becoming of another level when said first signal is at another leading edge after said period of inhibition, whereby said wave shaping means responsive to said inhibit signal provides said synchronizing signal to said control means after said period of inhibition so that said switching element is inhibited from being turned ON during said period of inhibition and whereby the switching period of said switching element remains substantially unchanged even with change of load.

2. The power source of claim 1, wherein said switching element comprises a MOSFET.

3. The power source of claim 1, wherein said switching element comprises a bipolar transistor.

4. The power source of claim 1, further comprises a capacitor connected in parallel to said switching element.

5. The power source of claim 1, wherein said wave shaping means comprises means for differentiating a leading edge of an output pulse from said inhibiting means to generate a pulse signal which is applied to said control means as a synchronizing signal.

6. A self-excited voltage resonant converted having frequency change minimizing function, comprising:

a transformer having primary winding, secondary winding and bias winding, and storing an energy in said primary winding while a switching element is turned ON and releasing said energy to said secondary winding while said switching element is turned OFF, a capacitor for causing resonating of a voltage in said primary winding at time periods determined by inductance and capacitance of said primary winding;

a control circuit for activating ON or OFF of said switching element by using a rectified and smoothed voltage generated in said bias winding and applied to one input terminal thereof;

a zero crossing detecting circuit for detecting a zero axis crossing by an output waveform of said bias winding;

a delay circuit for delaying a signal from said zero crossing detecting circuit by a certain period of time;

a mono-multivibrator circuit which is activated when said switching element is turned ON;

a D type flip-flop circuit to which is applied an output pulse from said mono-multivibrator and to which is applied a resulting signal from said delay circuit as a clock signal and which generates an output signal which is applied to another terminal of said control circuit so that turning ON of said switching element is inhibited, based on the output signal from said zero crossing detected circuit, for a certain period of time, and wherein an input voltage is applied to said primary winding, and an output voltage is produced at said secondary winding.

7. The converter of claim 6, further comprising a smoothing means connected to said secondary winding and to a load, said smoothing means comprising a diode and a capacitor.

8. The converter of claim 6, wherein said switching element is a MOSFET or a bipolar transistor, and said capacitor is connected in parallel to said switching element or said primary winding.

* * * * *